United States Patent [19]

Feimer et al.

[11] Patent Number: 5,045,354

[45] Date of Patent: Sep. 3, 1991

[54] PRODUCTION OF SUPPORTED THIN FILM MEMBRANES

[75] Inventors: Joseph L. Feimer, Brights Grove; Bernd A. Koenitzer, Clearwater, both of Canada

[73] Assignee: Exxon Research & Engineering Company, Florham Park, N.J.

[21] Appl. No.: 452,889

[22] Filed: Dec. 19, 1989

[51] Int. Cl.$^5$ .............................................. B05D 5/00
[52] U.S. Cl. .................................. 427/245; 427/393.5
[58] Field of Search ...................... 427/245, 246, 393.5; 210/500.27, 500.28

[56] References Cited

U.S. PATENT DOCUMENTS

| | | | |
|---|---|---|---|
| 2,930,754 | 3/1960 | Stuckey | 210/23 |
| 2,958,656 | 11/1960 | Stuckey | 210/23 |
| 3,370,102 | 2/1968 | Carpenter et al. | 260/674 |
| 3,567,810 | 3/1971 | Baker | 264/41 |
| 3,709,774 | 1/1973 | Kimura | 161/159 |
| 3,734,880 | 5/1973 | Finelli | 260/37 |
| 3,776,970 | 12/1973 | Strazik et al. | 260/669 |
| 3,876,738 | 4/1975 | Marinaccio et al. | 264/41 |
| 3,936,409 | 2/1976 | Schroeder et al. | 260/30.2 |
| 4,009,307 | 2/1977 | Erickson et al. | 427/377 |
| 4,028,327 | 6/1977 | Golovoy et al. | 528/485 X |
| 4,086,209 | 4/1978 | Hara et al. | 260/49 |
| 4,115,465 | 9/1978 | Elfert et al. | 260/674 |
| 4,340,479 | 7/1982 | Pall | 210/490 |
| 4,423,099 | 12/1983 | Mueller et al. | 428/35 |
| 4,528,004 | 7/1985 | Makino et al. | 55/158 |
| 4,837,054 | 6/1989 | Schucker | 427/244 |

FOREIGN PATENT DOCUMENTS

| | | |
|---|---|---|
| 50789 | 5/1982 | European Pat. Off. . |
| 150620 | 9/1981 | Fed. Rep. of Germany . |
| 151874 | 11/1981 | Fed. Rep. of Germany . |
| 151952 | 11/1981 | Fed. Rep. of Germany . |
| 9059220 | 4/1984 | Japan . |
| 250049 | 12/1985 | Japan . |
| 223370 | 5/1986 | Japan . |
| 1391559 | 4/1975 | United Kingdom . |
| 2115344 | 9/1983 | United Kingdom . |

*Primary Examiner*—Evan Lawrence
*Attorney, Agent, or Firm*—Joseph J. Allocca

[57] ABSTRACT

Supported thin film membranes of polyurethane, polyurea/urethane, polyurea/polyurethane alloy blends are prepared by depositing a solution of the appropriate polymer on a microporous hydrophobic support. The solution wets but does not soak through the hydrophobic support because the amounts and ratios of solvents and surfactant used to produce the solution have been adjusted to produce a solution having optimum coating properties (for example, surface tension, solvency, viscosity). The solvent of the solution comprises a mixture of a low surface tension solvent and a high solvency solvent. The polymer solution is optionally aged at least 1 day prior to being coated on the microporous support.

24 Claims, No Drawings

PRODUCTION OF SUPPORTED THIN FILM MEMBRANES

BACKGROUND OF THE INVENTION

The present invention is directed to a method for providing high flux, thin film composite membranes on a microporous hydrophobic support.

The use of membranes to separate aromatics from saturates has long been pursued by the scientific and industrial community and is the subject of numerous patents.

U.S. Pat. No. 3,370,102 describes a general process for separating a feed into a permeate stream and a retentate stream and utilizes a sweep liquid to remove the permeate from the face of the membrane to thereby maintain the concentration gradient driving force. The process can be used to separate a wide variety of mixtures including various petroleum fractions, naphthas, oils, hydrocarbon mixtures. Expressly recited is the separation of aromatics from kerosene.

U.S. Pat. No. 2,958,656 teaches the separation of hydrocarbons by type, i.e. aromatic, unsaturated, saturated, by permeating a portion of the mixture through a non-porous cellulose ether membrane and removing permeate from the permeate side of the membrane using a sweep gas or liquid. Feeds include hydrocarbon mixtures, naphtha (including virgin naphtha, naphtha from thermal or catalytic cracking, etc.).

U.S. Pat. No. 2,930,754 teaches a method for separating hydrocarbons e.g. aromatic and/or olefins from gasoline boiling range mixtures, by the selective permeation of the aromatic through certain cellulose ester non-porous membranes. The permeated hydrocarbons are continuously removed from the permeate zone using a sweep gas or liquid.

U.S. Pat. No. 4,115,465 teaches the use of polyurethane membranes to selectively separate aromatics from saturates via pervaporation.

U.S. Pat. No. 4,837,054 teaches thin film composite membranes prepared by deposition from a solution. A thin film of polyurea/urethane is coated onto a microporous support substrate from a multi-component solvent system. The solution of polyurea/urethane copolymer is prepared in a solution system consisting of an aprotic solvent such as dimethylformamide, a cyclic ether such as dioxane, a third component comprising cellosolve acetate or methyl cellosolve and a wetting agent such as crotyl alcohol. The polymer in the solvent solution is deposited as a thin film on a support substrate such as polyethylene, polypropylene or teflon after which excess polymer/solvent solution is permitted to drain from the support. Thereafter the solvents are permitted to evaporate leaving a thin layer of active polyurea/urethane copolymer on the support backing. The solvent system employed constitutes a mixture of (a) an aprotic solvent such as DMF, (b) a cyclic ether such as dioxane, (c) cellosolve acetate or methyl cellosolve, and (d) a wetting agent such as crotyl alcohol. These solvents are used in a parts per hundred ratio of a/b/c/d in the range about 3-27/94-33/2-33/1-7. The polyurea/urethane copolymer exists as a true, complete copolymer in the solvent system and the polymer-solvent system exists as a true solution. The polymer concentration in the solution can range up to 40 parts polymer per 100 parts solvent, preferably 0.5 to about 20 parts polymer, more preferably 1 to 10 parts polymer, most preferably 1 to 5 parts polymer per 100 parts solvent solution.

SUMMARY OF THE INVENTION

High flux, thin film composite membranes comprising a thin, dense, selective polymeric film, preferably of polyurethane, polyurea/urethane, polyurethane/imide or polyurea/polyurethane copolymer alloy, on a microporous hydrophobic support backing are prepared by wash coating an optimum wetting solution of the polymer in solvent onto the hydrophobic support. The viscosity @ 20° C. of the wetting solution of polymer in solvent should be between 5 and 100 cps, preferably between 10 and 50 cps and more preferably between 20 and 40 cps. The optimum solution viscosity can be obtained by adding viscosity modifiers, adjusting the polymer concentration/solvent composition, by aging the solution or a combination of these techniques.

DETAILED DESCRIPTION OF THE INVENTION

Supported thin film composite membranes comprising a thin active layer deposited onto a microporous hydrophobic support are described. The thin film composite membrane is prepared by depositing a thin film of polymer from solution onto the microporous hydrophobic support. The polymer solution is capable of properly wetting the hydrophobic support because the solution includes a solvent of low surface tension and a surfactant. The solvents must possess the optimum wetting characteristics such that the solution wets the surface but does not soak into the pores of the hydrophobic microporous support. Low flux membranes result when the solution soaks into the pores. For example, pure (100%) dimethylformamide will bead-up on teflon and a non-continuous, defective membrane layer will result. The addition of a low surface tension solvent such as acetone, however, will allow the solvent mixture to wet the teflon surface. A 60/40 in wt % DMF/acetone mixture produces the optimum wetting characteristics for a 5 wt % polymer solution since it coats the surface but does not soak into the pores. A DMF/acetone ratio greater than 10/90 in wt %, however, will soak into the pores.

Although the actual ratio employed will depend on the concentration of polymer present in the solvent solution, the ratio will be within the ranges 10/90 to 90/10 in wt %.

The viscosity of the wetting solution of polymer in solvent should be between 5 and 100 cps at 20° C., preferably between 10 and 50 cps at 20° C. and more preferably between 20 and 40 cps at 20° C. The optimum solution viscosity can be obtained, for example, by either adding viscosity modifiers (such as Monsanto's Modaflow), adjusting the polymer concentration/solvent composition, aging the solution or a combination of these techniques. The polymer solution should be aged for at least 1 day prior to being coated on the hydrophobic support. Preferably the polymer solution is aged 3 days and more preferably about 7 days prior to being coated onto hydrophobic supports, such as teflon or polypropylene. No special atmosphere need be used, provided the polymer solution is not exposed to an atmosphere with which it chemically reacts. Aging is practiced so as to increase the viscosity of the solution to within the previously recited desired range. Aging temperature is not critical except that aging at slightly elevated temperature will result in a decrease in aging time needed for the solution to achieve a viscosity in the desired previously recited ranges.

The polymer solution used is preferably a solution of polyurea/urethane copolymer, polyurea/polyurethane copolymer alloy, polyurethane-imide or polyurethane in solvent.

The polymer concentration in the polymer solution can range from 0.1 to 10.0 wt %. Thinner active layers are obtained when a lower concentration solution is used. Thin active layers in the range 0.1 to 10 micron, preferably 0.5 to 5 microns in thickness can be obtained.

Thin film composite membrane made by depositing a thin active layer of polyurea/urethane, polyurethane/imide or polyurethane from a polymer solvent solution system onto a microporous support substrate are useful for separating aromatic hydrocarbons from saturated hydrocarbons and are of particular utility in the chemicals industry for recovering/concentrating aromatics such as benzene, toluene, xylenes, etc. from chemicals streams and in the petroleum industry for recovering aromatics from saturates in heavy feed streams such as naphtha, catalytic naphtha, heavy cat naphtha, light gas oils, light cat gas oils, reformates etc.

Examples of polyurea/urethane copolymers which can be used to produce the thin active layer of the thin film composite membrane herein described and which are effective when in the form of membranes in performing the separating are described in U.S. Pat. No. 4,914,064 and in its commonly owned continuation-in-part application U.S. Ser. No. 336,172 filed Apr. 11, 1989 in the name of Robert C. Schucker.

The polyurea/urethane membrane described in U.S. Pat. No. 4,914,064, which is effective in separating aromatics from saturates, is distinguished by being aromatic in nature and possessing other certain and specific characteristics.

The aromatic polyurea/urethane polymer used to produce the thick dense film membrane of that invention is characterized by possessing a urea index of at least about 20% but less than 100%, an aromatic carbon content of at least about 15 mole percent, a functional group density of at least about 10 per 1,000 grams of polymer and C=O/NH ratio of less than about 8.

In that disclosure the dense, thick film aromatic polyurea/urethane layer is produced using an aromatic polyurea/urethane copolymer which is itself prepared by reacting dihydroxy or polyhydroxy compounds (e.g., polyethers or preferably polyesters of about 250 to 5000 molecular weight, or mixtures of different molecular weight polymers of the same type, i.e. about 30:70/70:30 mixtures of an about 500 molecular wt. component (polyester or polyether) and an about 2000 molecular wt. component (polyester or polyether) with aliphatic, alkylaromatic or aromatic diisocyanates or polyisocyanates and low molecular weight chain extenders, such as diamines, polyamines or amino alcohols. The choice of the molecular weight of the polyether or polyester component is a matter of compromise. Polyether or polyester components of 500 molecular weight give membranes of highest selectivity, but lower flux. Polyesters or polyethers of higher molecular weight (e.g. 2000) give membranes of lower selectivity but higher flux. Thus, the choice of the single molecular weight or blend is a matter of choice and compromise between selectivity and flux. The ratio of these components used in producing the polyurea/urethane copolymer is governed by the aforementioned characteristics possessed by the membranes useful for aromatic from saturate separation. The copolymer produced possesses a urea index of at least about 20% but less than 100%, preferably at least about 30% but less than 100%, most preferably at least about 40% but less than 100%. By urea index is meant the percentage of urea groups relative to the total urea plus urethane groups in the polymer. The copolymer also contains at least about 15 mole percent, and preferably at least about 20 mole percent aromatic carbon, expressed as a percent of the total carbon in the polymer. The copolymer also possesses a particular density of functional groups (DF ratio) defined as the total of C=O+NH per 1000 grams of polymer, the density of functional group being at least about 10, preferably at least about 12 or greater. Finally, to insure that the functional groups are not mostly carbonyl, the C=O/NH ratio is less than about 8 and preferably less than about 5.0. This insures that there is sufficient hydrogen bonding within the polymer to result in strong polymer chain interactions and high selectivity. This polyurea/urethane copolymer formulation can be used in producing the polymer solutions described in the present invention employed in making the thin film composite membrane described herein.

Other polyurethane and polyurea/urethane polymers described in the literature, such as those described in U.S. Pat. No. 4,115,465 (which can be characterized as aliphatic polyurethanes or polyurea/urethanes) can also be employed in the present solution casting procedure to produce TFC membranes of the present invention.

The thin film composite membranes made by the process of the present invention are especially well suited for separating aromatics from saturates in heavy feeds, such as heavy cat naphtha, wherein the constituents making up the feed include, in some cases, highly complex, multi-ring, heavily substituted aromatic species.

As previously stated, the thin film composite membranes are produced from a polyurea/urethane copolymer made from dihydroxy or polyhydroxy compounds, such as polyethers or polyester of 500 to 5000 molecular weight, reacted with aliphatic, alkylaromatic or aromatic diisocyanates or olyisocyanates and low molecular weight chain extenders, such as diamines, polyamines or amino alcohols.

The polyester components are prepared from aliphatic or aromatic dicarboxylic acids and aliphatic or aromatic dialcohols. Aliphatic dicarboxylic acids refer to those materials having the general formula HOOCRCOOH where R contains 2 to 10 carbons (and may be either a straight, branched chain or cyclo configuration). Aromatic dicarboxylic acids refer to those materials having the general structure HOOCRCOOH where R is:

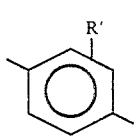 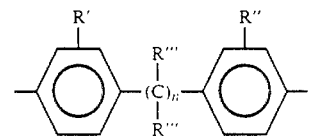

I   II wherein R', R" and R'" may be the same or different and are selected from the group consisting of H and $C_1$–$C_5$ carbons or $C_6H_5$ and combinations thereof, and n is 0 to 4. It is to be understood that in the above formula each R' or R" may itself represent a mixture of H, $C_1$–$C_5$ or $C_6H_5$.

Dialcohols have the general structure HOROH where R may be

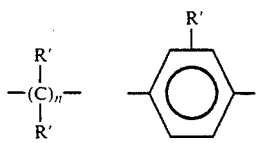

where n is 1 to 10, preferably 4 to 6, and R' is H, $C_1$ to $C_5$ or $C_6H_5$ or

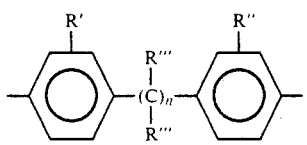

where R', R", R'" and n are defined in the same manner as for the aromatic dicarboxylic acids. An example of a useful dialcohol is bisphenol A.

The diisocyanates can be aromatic diisocyanates having the general structure:

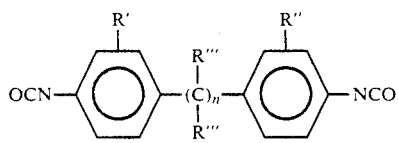

wherein R', R" and R'" are the same or different and are selected from the group consisting of H, $C_1$–$C_5$ and $C_6H_5$ and mixtures thereof and n ranges from 0 to 4. Aliphatic, cycloaliphatic, aromatic, and araliphatic diisocyanates or polyisocyanates can also be used, thus resulting in the production of aromatic or aliphatic polyurethanes, polyurea/urethanes or polyurethane imides.

Diamine chain extenders have the general formula $H_2NRNH_2$ where R includes aliphatic and aromatic moieties such as

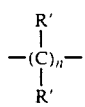

where n is 1 to 10 and R' may be the same or different and are selected from the group consisting of H, $C_1$–$C_5$ carbons and $C_6H_5$ and mixtures thereof.

Also included are diamine chain extenders of the formula:

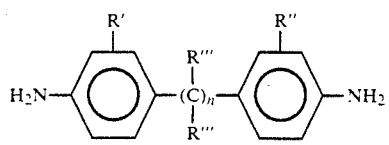

where R', R" and R'" are the same or different and are selected from the group consisting of H or Cl or a $C_1$ to $C_5$ or $C_6H_5$ and mixtures thereof and n ranges from 0 to 4.

Examples of the polyether polyols useful in the present invention as polymer precursors are polyethylene glycols, (PEG), polypropylene glycol (PPG), polytramethylene glycol, PEG/PPG random copolymers, etc. having molecular weight ranging from about 250 to 4000.

Aliphatic diisocyanates which may be utilized are exemplified by hexamethylene diisocyanate (HDI), 1,6-diisocyanato-2,2,4,4-tetramethylhexane (TMDI), 1,4-cyclohexanyl diisocyanate (CHDI), isophorone diisocyanate (IPDI), while useful alkylaromatic diisocyanates are exemplified by toluene diisocyanate (TDI) and bitolylene diisocyanate (TODI). Aromatic diisocyanates are exemplified by 4,4'-diisocyanato diphenylmethane (MDI). Polyisocyanates are exemplified by polymeric MDI (PMDI) and carbodiimide modified MDI. Useful polyamines are exemplified by polyethyleneimines, 2,2',2" triaminotriethylamine, 4,4'-diamino 3,3'dichloro-diphenylmethane (MOCA). Useful amino alcohols are exemplified by 6-aminohexanol, 4-aminophenol, 4-amino-4'-hydroxyl-diphenylmethane.

The above are presented solely by way of example. Those skilled in the art, with the present teaching before them, can select from the innumerable materials available the various starting materials which upon combination as described herein will produce a polyurea/urethane copolymer having the desired characteristics which can then be cast into the membranes useful for the separation of aromatics from saturates.

Polyurethanes are prepared using the reactants recited above, omitting the polyamine or amino alcohol chain extenders.

Polyurethane imides are produced by endcapping a polyol selected from those recited above with a polyisocyanate also selected from those recited above while aliphatic and cycloaliphatic di- and polyisocyanates can also be used as can be mixtures of aliphatic, cycloaliphatic, aralkyl and aromatic polyisocyanates followed by chain extending by reaction with a polyanhydride which produces the imide directly or with di or poly carboxylic acids which produce amic acid groups which can be condensed/cyclized to the imide. Polyurethane imides are the subject of U.S. Pat. No. 4,929,358 to Bernd A. Koenitzer.

The polymer, preferably polyurea/urethane copolymer, polyurethane, or polyurethane/imide is prepared in a suitable dissolving solvent. The solvent(s) chosen must not only be capable of dissolving the polymer, preferably polyurea/urethane copolymer, polyurethane or polyurethane/imide but must also be capable of wetting the hydrophobic support upon which the polymer solution is to be coated. The solvent(s) must possess the optimum wetting characteristics such that the solution wets the surface but does not soak into the pores of the hydrophobic microporous support. For example, with a solvent mixture of dimethylformamide (high solvency) and acetone (low surface tension) complete soak through can be obtained at high acetone concentrations while non-wetting conditions result at high dimethylformamide concentrations. Thus, the optimum dimethylformamide/acetone solvent ratios lies between 10/90 and 90/10 in wt %. The surface tension at 20° C. of the low surface tension solvent should be less than 35 dyne/cm, preferably less than 30 dyne/cm and more preferably less than 25 dyne/cm. The surface tension of acetone at 20° C. is 23 dyne/cm. Other examples of low surface tension solvents are toluene, heptane and hexane.

Solvents with high solvency (good solvents) are characterized by a high polar solubility parameter. The polar solubility parameter at 25° C. of a good solvent should be greater than 3 $(cal/cc)^{\frac{1}{2}}$, preferably greater than 5 $(cal/cc)^{\frac{1}{2}}$ and more preferably greater than 7 $(cal/cc)^{\frac{1}{2}}$. Dimethylformamide has a polar solubility parameter of 8.07 $(cal/cc)^{\frac{1}{2}}$. Other examples of good solvents are dimethylsulphoxide and dimethylacetamide.

The solvent used in the membrane preparation process will comprise a mixture of high solvency solvent and low surface tension solvent used in a ratio of about 10/90 to 90/10, preferably about 20/80 to 80/20, most preferably about 40/60 to 60/40 in wt %.

Preferably the solution uses not only a wetting solvent but also have a wetting surfactant present such as crotyl alcohol or zonyl FSN, a Dupont fluoro-surfactant. Preferably, less than 5% wetting surfactant should be used.

In order to insure that the membrane coating layer is thin and in the range of 0.1 to 10 $\mu$, preferably 0.5 to 5 $\mu$, the polymer concentration in solution should be in the range of about 10 wt % polymer, and less, preferably lower concentrations are used, 0.5 to 8 wt %, more preferably 0.5 to 5 wt %.

The viscosity of the wetting solution of polymer in solvent should be between 5 and 100 cps, preferably between 10 and 50 cps and more preferably between 20 and 40 cps. The optimum solution viscosity can be obtained, for example, by either adding viscosity modifiers, adjusting the polymer concentration/solvent composition, by aging the solution or by a combination of these techniques. Aging the polymer solution unexpectedly produces composite membranes of higher selectivity as compared to thin film composite membrane made using a polymer solution of the same composition but which was not aged and which did not possess a viscosity in the desired range. The polymer solution is aged for at least 1 day, preferably at least 3 days, more preferably at least 7 days. Aging is accomplished by permitting the polymer solution to stand at room temperature in a non-reacting atmosphere. Using temperatures higher than room temperature will reduce the aging time to achieve an equivalent viscosity.

The support which is coated with this aged polymer solution is a hydrophobic, microporous support such as teflon or polypropylene.

Following deposition of a layer of the polymer solution on the hydrophobic microporous support, the excess solution is poured off and the solvent portion of what remains is permitted to evaporate. Solvent evaporation can be performed by simply permitting the solvent to dispel into the atmosphere or solvent evaporation can be augmented by the addition of heat and/or the application of a vacuum.

The thin film composite membranes are useful for the separation of aromatics from saturates in petroleum and chemical streams, and have been found to be particularly useful for the separation of large substituted aromatics from saturates as are encountered in heavy cat naphtha streams. Other streams which are also suitable feed streams for aromatics from saturates separation are intermediate cat naphtha streams, (200°–320° F.) light aromatics content streams boiling in the $C_5$–300° F. range, light catalytic cycle oil boiling in the 400°–650° F. range as well as streams in chemical plants which contain recoverably quantities of benzene, toluene, xylene (BTX) or other aromatics in combination with saturates. The separation techniques which may successfully employ the membranes of the present invention include perstraction an pervaporation.

Perstraction involves the selective dissolution of particular components contained in a mixture into the membrane, the diffusion of those components through the membrane and the removal of the diffused components from the downstream side of the membrane by use of a liquid sweep stream. In the perstractive separation of aromatics from saturates in petroleum or chemical streams (particularly heavy cat naphtha streams) the aromatic molecules present in the feedstream dissolve into the membrane film due to similarities between the membrane solubility parameter and those of the aromatic species in the feed. The aromatics then permeate (diffuse) through the membrane and are swept away by a sweep liquid which is low in aromatics content. This keeps the concentration of aromatics at the permeate side of the membrane film low and maintains the concentration gradient which is responsible for the permeation of the aromatics through the membrane.

The sweep liquid is low in aromatics content so as not to itself decrease the concentration gradient. The sweep liquid is preferably a saturated hydrocarbon liquid with a boiling point much lower or much higher than that of the permeated aromatics. This is to facilitate separation, as by simple distillation. Suitable sweep liquids, therefore, would include, for example, $C_3$ to $C_6$ saturated hydrocarbons and lube basestocks ($C_{15}$–$C_{20}$).

The perstraction process is run at any convenient temperature, preferably as low as possible.

The choice of pressure is not critical since the perstraction process is not dependent on pressure, but on the ability of the aromatic components in the feed to dissolve into and migrate through the membrane under a concentration driving force. Consequently, any convenient pressure may be employed, the lower the better to avoid undesirable compaction, if the membrane is supported on a porous backing, or rupture of the membrane, if it is not.

If $C_3$ or $C_4$ sweep liquids are used at 25° C. or above in liquid state, the pressure must be increased to keep them in the liquid phase.

Pervaporation, by comparison, is run at generally higher temperatures than perstraction and relies on vacuum on the permeate side to evaporate the permeate from the surface of the membrane and maintain the concentration gradient driving force which drives the separation process. As in perstraction, the aromatic molecules present in the feed dissolve into the membrane film, migrate through said film and re-emerge on the permeate side under the influence of a concentration gradient. Pervaporative separation of aromatics from saturates can be performed at a temperature of about 25° C. for the separation of benzene from hexane but for separation of heavier aromatic/saturate mixtures, such as heavy cat naphtha, higher temperatures of at least 80° C. and higher, preferably at least 100° C. and higher, more preferably 120° C. and higher should be used. The maximum upper temperature limit is that temperature at which the membrane is physically damaged or delaminates. Vacuum on the order of 1–50 mm Hg is pulled on the permeate side. The vacuum stream containing the permeate is cooled to condense out the highly aromatic permeate. Condensation temperature should be below the dew point of the permeate at a given vacuum level.

The membrane itself may be in any convenient form utilizing any convenient module design. Thus, sheets of membrane material may be used in spiral wound or plate and frame permeation cell modules. Tubes and hollow fibers of membranes may be used in bundled configurations with either the feed or the sweep liquid (or vacuum) in the interior space of the tube or fiber, the complimentary environment obviously being maintained on the other side.

The present invention will be better understood by reference to the following Examples which are offered by way of illustration and not limitation.

EXAMPLE 1

A solution containing a polyurea-urethane polymer is prepared as follows. Four point five six (4.56) grams (0.00228 moles) of polyethylene adipate (MW=2000), 2.66 grams (0.00532 moles) of 500 MW polyethylene adipate and 3.81 grams (0.0152 moles) of 4,4'-diphenylmethane diisocyanate are added to a 250 ml flask equipped with a stirrer and drying tube. The temperature is raised to 90° C. and held for 2 hours with stirring to produce an isocyanate-end-capped prepolymer. Twenty grams of dimethylformamide is added to this prepolymer and the mixture is stirred until clear. One point five grams (0.0076 moles) of 4,4' diaminodiphenylmethane is dissolved in ten grams of dimethylformamide and then added as chain extender to the prepolymer solution. This mixture was then allowed to react at room temperature (approx. 22° C.) for 20 minutes. The viscosity of the solution was approximately 100 cps. Films were cast on glass using a 5 mil casting knife and then dried in an oven at 90° C. for 2 hours. This technique produced a 20 micron dense film as a comparison for the thin film composites (TFC).

EXAMPLE 2

The polymer solution was made according to Example 1 and then diluted to 5 wt % such that the solution contained a 60/40 wt % blend of dimethylformamide/acetone. The solution was allowed to stand for 7 days at room temperature. The viscosity of the aged solution was 35 cps. After this period of time one wt % Zonyl FSN (Dupont) fluorosurfactant was added to the aged solution. (Note: the fluorosurfactant could also be added prior to aging). A microporous teflon membrane (K-150 from Desalination Systems Inc.) with nominal 0.1 micron pores was wash-coated with the polymer solution. The coating was dried with a hot air gun immediately after the wash-coating was complete. This technique produced composite membranes with the polyurea/urethane dense layer varying between 3 to 4 microns in thickness. Thinner coatings could be obtained by lowering the polymer concentration in the solution while thicker coatings are attained at higher polymer concentrations.

TABLE 1

| (HCN Feed: 52 vol % arom, pervap @ 140° C./5-10 mbar, <5 LV % yields) | | |
|---|---|---|
| Membrane | Example 1 | Example 2 |
| Type | Dense Film | TFC |
| Coating Thickness (μ) | 21 | 3 |
| Permeate Quality | | |
| RI @ 20° C. | 1.5004 | 1.5000 |
| Arom. vol %[1] | 86.1 | 85.7 |

TABLE 1-continued

| (HCN Feed: 52 vol % arom, pervap @ 140° C./5-10 mbar, <5 LV % yields) | | |
|---|---|---|
| Membrane | Example 1 | Example 2 |
| Permeate Flux, kg/m²-d | 40.9 | 270.0 |

[1]Aromatics concentration based on an RI correlation developed for the specific HCN feed using an FIA analysis (Fluorescent Indicating Analysis, ASTM D1319) (Arom = 807.99 × RI - 1126.24).

The data in Table 1 show more than a six-fold increase in the flux performance of the thin film composites compared to the dense films. Clearly, this represents a significant improvement.

EXAMPLE 3

A thin film composite was prepared from the same solution as in Example 2 except that the solution was only allowed to age for 3 days. The solution had a viscosity of only 3 cps.

TABLE 2

| (HCN Feed: 52 vol % arom, pervap @ 140° C./5-10 mbar, <5 LV % yields) | | |
|---|---|---|
| Run | M-229R | M-228 |
| Membrane | Example 2 | Example 3 |
| Type | TFC | TFC |
| Solution Age, days | 7 | 3 |
| Coating Thickness (μ) | 3 | 1 |
| Permeate Quality | | |
| RI @ 20° C. | 1.5000 | 1.4713 |
| Arom, vol %[1] | 85.7 | 52.0 |
| Permeate Flux, kg/m²-d | 270.0 | >2000 |

[1]Aromatics concentration based on an RI correlation developed for the specific HCN feed using an FIA analysis (Arom = 807.99 × RI - 1126.24).

The data in Table 2 clearly shows that aging the solution improves the membrane performance.

EXAMPLE 4

A thin film composite was prepared as in Example 2 except that a nylon microporous support (0.1 microns) was washed-coated. (same aged solution)

TABLE 3

| (HCN Feed: 52 vol % arom, pervap @ 140° C./5-10 mbar, <5 LV % yields) | | |
|---|---|---|
| Run | M-229R | M-228 |
| Membrane | Example 2 | Example 4 |
| Type | TFC | TFC |
| Support | 0.1μ Teflon | 0.1μ Nylon |
| Permeate Quality | | |
| RI @ 20° C. | 1.5000 | 1.4953 |
| Arom, vol %[1] | 85.7 | 81.8 |
| Permeate Flux, kg/m²-d | 270.0 | 87.0 |

[1]Aromatics concentration based on an RI correlation developed for the specific HCN feed using an FIA analysis (Arom = 807.99 × RI - 1126.24).

The data in Table 3 clearly show that using high surface tension hydrophilic supports such as nylon produces low flux membranes. Polymer solution soaked into the nylon.

EXAMPLE 5

A solution was prepared as in Example 2 except that the polymer solvent was 100% dimethylformamide (DMF) instead of a 60/40 wt % blend of DMF/acetone. This solution did not coat the 0.1 micron Teflon support despite using 1 wt % Zonyl FSN (Dupont) fluorosurfactant, and a defective membrane layer was obtained. As a result of the poor coatability of the solution, these membranes showed high flux and no aromatics/saturates separation.

EXAMPLE 6

A solution containing a polyurea-urethane polymer is prepared as follows. Ten point six (10.6) grams (0.00532 moles) of polyethylene adipate (MW=2000), 2.66 grams (0.00532 moles) of 500 MW polyethylene adipate and 5.33 grams (0.02128 moles) of 4,4-diphenylmethane diisocyanate are added to a 250 ml flask equipped with a stirrer and drying tube. The temperature is raised to 90° C. and held for 2 hours with stirring to produce an isocyanate-end-capped prepolymer. Twenty grams of dimethylformamide is added to this prepolymer and the mixture is stirred until clear. Four point two grams (0.02128 moles) of 4,4'diaminodiphenylmethane is dissolved in two grams of dimethylformamide and then added as a chain extender to the prepolymer solution. This mixture is then allowed to react at room temperature (approx. 20° C.) for 20 minutes. The polymer solution is then diluted to 10 wt % with dimethylformamide. The viscosity of the solution is approximately 75 cps. One wt % Zonyl FSN fluorosurfactant (Dupont) is added and then the solution is wash coated onto a 0.1 micron porous Teflon membrane sample (K-150 from Desalination Systems Inc.). Despite possessing a viscosity in the desired range, this solution does not wet the Teflon very well and as a result large gaps exist in the polymer coating after drying.

EXAMPLE 7

A polymer solution is prepared as in Example 1 and then diluted to 10 wt % in a 50/50 wt % dimethylformamide/acetone solvent mixture. The viscosity of the solution was approximately 75 cps. This solution was used to wash coat 0.1 micron porous Teflon. Initially the solution wetted the Teflon but as the acetone evaporated the remaining solution beaded-up on the surface forming a non-continuous polymer layer.

EXAMPLE 8

One wt % Zonyl FSN fluorosurfactant (Dupont) was added to the solution prepared as in Example 7. This solution was used to coat 0.1 micron porous Teflon. The solution wetted the Teflon and formed a continuous dense layer after drying. Viscosity was already about 75 cps so aging was not needed. Coating thickness after drying was 7 μ.

As shown in Table 4 a continuous dense layer is required to achieve separation (i.e., Example 8 membrane). Table 4 shows that a continuous dense layer can be formed with a polymer solution in a dimethylformamide/acetone solvent mixture and Zonyl FSN fluorosurfactant. These examples, in combination with Example 3 demonstrate that the polymer solution must possess a viscosity in the recited range and, further, the need for a low surface tension solvent such as acetone and a fluorosurfactant such as Zonyl FSN to obtain a thin, continuous dense separation barrier.

TABLE 4

Effect of Solvent Mixture and Fluorosurfactant on Wetting
(Model feed: 50% aromatics, perstraction @ 80° C., <5 LV % yields)

| Membrane | 6 | 7 | 8 |
|---|---|---|---|
| Solvent | DMF | DMF/acetone | DMF/acetone |
| Zonyl FSN, wt % | 1 | 0 | 1 |
| Coating | non- | non- | continuous |

TABLE 4-continued

Effect of Solvent Mixture and Fluorosurfactant on Wetting
(Model feed: 50% aromatics, perstraction @ 80° C., <5 LV % yields)

| Membrane | 6 | 7 | 8 |
|---|---|---|---|
| Integrity | continuous | continuous | |
| Permeate Aromatics | 50 | 50 | 86 |

What is claimed is:

1. A method for producing a thin film composite (TFC) membrane comprising a thin, dense selective polymeric film about 0.1 to 10 μ thick on a microporous hydrophobic support backing by wash coating the hydrophobic support with a wetting solution of polymer in solvent, said wetting solution being one which wets the surface of but does not soak into the pores of the microporous hydrophobic support, and having a viscosity in the range of 5 to 100 cps @ 20° C., said polymer in solvent solution comprising 10% or less polymer in a solvent, said solvent comprising a mixture of low surface tension solvent having a surface tension at 20° C. of less than 35 dyne/cm and a high solvency solvent having a high polar solubility parameter at 25° C. of greater than $3(cal/cc)^{\frac{1}{2}}$ in a ratio of low surface tension solvent/high solvency solvent of 10/90 to 90/10 wt % and further containing a surfactant; draining the excess solution; and evaporating the solvent.

2. The method of claim 1 wherein the thin, dense, selective polymer film is 0.5 to 5.0 μ thick.

3. The method of claim 1 wherein the polymeric solution has a viscosity in the range 10 to 50 cps at 20° C.

4. The method of claim 1 wherein the polymeric solution has a viscosity in the range 20 to 40 cps at 20° C.

5. The method of claim 1, 2, 3 or 4 further comprising the step off aging the polymeric solution for a period of at least 1 day before applying the polymeric solution as a wash coat to the hydrophobic support.

6. The method of claim 1, 2, 3 or 4 further comprising the step of aging the polymeric solution for a period of at least 3 days before applying the polymeric solution as a wash coat to the hydrophobic support.

7. The method of claim 1, 2, 3 or 4 further comprising the step of aging the polymeric solution for a period of at least 7 days before applying the polymeric solution as a wash coat to the hydrophobic support.

8. The method of claim 1, 2, 3 or 4 wherein the low surface tension/high solvency solvent ratio is in the range 20/80 to 80/20 wt %.

9. The method of claim 1, 2, 3 or 4 wherein the low surface tension/high solvency solvent ratio is in the range 40/60 to 60/40 wt %.

10. The method of claim 5 wherein the low surface tension/high solvency solvent ratio is in the range 20/80 to 80/20 wt %.

11. The method of claim 5 wherein the low surface tension/high solvency solvent ratio is in the range 40/60 to 60/40 wt %.

12. The method of claim 6 wherein the low surface tension/high solvency solvent ratio is in the range 20/80 to 80/20 wt %.

13. The method of claim 6 wherein the low surface tension/high solvency solvent ratio is in the range 40/60 to 60/40 wt %.

14. The method of claim 7 wherein the low surface tension/high solvency solvent ratio is in the range 20/80 to 80/20 wt %.

15. The method of claim 7 wherein the low surface tension/high solvency solvent ratio is in the range of 40/60 to 60/40 wt %.

16. The method of claim 1, 2, 3 or 4 wherein the hydrophobic support is Teflon or polypropylene.

17. The method of claim 5 wherein the hydrophobic support is Teflon or polypropylene.

18. The method of claim 7 wherein the hydrophobic support is Teflon or polypropylene.

19. The method of claim 8 wherein the hydrophobic support is Teflon or polypropylene.

20. The method of claim 10 wherein the hydrophobic support is Teflon or polypropylene.

21. The method of claim 12 wherein the hydrophobic support is Teflon or polypropylene.

22. The method of claim 14 wherein the hydrophobic support is Teflon or polypropylene.

23. The method of claim 1, 2, 3 or 4 wherein the surfactant is crotyl alcohol or a fluoro surfactant.

24. The method of claim 1, 2, 3 or 4 wherein the polymer in the polymeric solution is polyurea/urethane, polyurethane or polyurethane/imide.

* * * * *